(12) United States Patent
Akimoto

(10) Patent No.: US 8,879,710 B2
(45) Date of Patent: Nov. 4, 2014

(54) PRIVATE BRANCH EXCHANGE, VOICE QUALITY ADJUSTMENT METHOD, AND NON-TRANSITORY COMPUTER-READABLE MEDIUM STORING VOICE QUALITY ADJUSTING PROGRAM

(75) Inventor: Ichirou Akimoto, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 13/819,271

(22) PCT Filed: Feb. 22, 2011

(86) PCT No.: PCT/JP2011/000977
§ 371 (c)(1),
(2), (4) Date: Feb. 26, 2013

(87) PCT Pub. No.: WO2012/046357
PCT Pub. Date: Apr. 12, 2012

(65) Prior Publication Data
US 2013/0170636 A1 Jul. 4, 2013

(30) Foreign Application Priority Data

Oct. 6, 2010 (JP) .................................. 2010-226578

(51) Int. Cl.
*H04M 3/00* (2006.01)
*H04M 7/00* (2006.01)

(51) Int. Cl.
(52) U.S. Cl.
CPC ....... *H04M 3/002* (2013.01); *H04Q 2213/1319* (2013.01); *H04M 3/42314* (2013.01); *H04M*
(Continued)

(58) Field of Classification Search
CPC .............. H04M 3/002; H04M 3/2236; H04M 3/42314; H04M 3/42323; H04M 3/4234; H04M 3/546; H04M 7/009; H04M 1/733; H04Q 2213/1322; H04Q 2213/13222; H04Q 2213/1328; H04Q 2213/13384; H04Q 2213/22; H04Q 2213/222; H04Q 2213/384; H04Q 2213/385

USPC .......... 379/220.01, 221.06, 221.07, 229, 231, 379/242, 406.01, 406.05, 406.06, 406.07, 379/406.08; 370/252, 286, 289, 395.2, 370/395.21
See application file for complete search history.

(56) References Cited

U.S. PATENT DOCUMENTS 5,521,919 A 5/1996 Anderson et al.
7,167,451 B1 * 1/2007 Oran ............................ 370/252
(Continued)

FOREIGN PATENT DOCUMENTS

DE 102005005561 A1 8/2006
EP 0705016 A2 4/1996
(Continued)

OTHER PUBLICATIONS

Communication dated Dec. 2, 2013, issued by the European Patent Office in corresponding Application No. 11830298.3.

*Primary Examiner* — Antim Shah
(74) *Attorney, Agent, or Firm* — Sughrue Mion, PLLC

(57) ABSTRACT

Provided is a private branch exchange capable of independently adjusting call voice level and call quality according to a connection type of a communication line or a telephone. The private branch exchange includes an audio quality characteristic configuration DB (116) for storing audio quality adjustment values of gain circuits (112 and 122) and an echo canceller circuit (121) for which optimal call quality can be obtained according to a combination for each group of telephone type and line type to connect for a telephone call, and a connection path DB (117) for storing information related to a connection path determined by a combination of a telephone and a communication line to connect for the telephone call, in which if there is a connection request from the telephone or the communication line, the connection path DB (117) is referred to obtain, by referring to the audio quality characteristic configuration DB (116), audio quality adjustment values to be set for the gain circuits (112 and 122) and the echo canceller circuit (121) which exist on the connection path that is determined, to perform settings for the gain circuits (112 and 122) and the echo canceller circuit (121).

5 Claims, 3 Drawing Sheets

(51) Int. Cl.
  *H04Q 3/62* (2006.01)
  *H04M 3/22* (2006.01)
  *H04M 3/42* (2006.01)

(52) U.S. Cl.
  CPC ........ 7/006 (2013.01); *H04Q 3/625* (2013.01); *H04M 3/2236* (2013.01); *H04Q 2213/1322* (2013.01)
  USPC ........ 379/242; 379/221.07; 370/286

(56) References Cited

U.S. PATENT DOCUMENTS

2002/0164013 A1* 11/2002 Carter et al. ............ 379/387.02
2004/0170164 A1* 9/2004 LeBlanc et al. ............ 370/389
2009/0225670 A1* 9/2009 Leung et al. ............ 370/252

FOREIGN PATENT DOCUMENTS

| | | |
|---|---|---|
| EP | 0884884 A2 | 12/1998 |
| JP | 11-112614 A | 4/1999 |
| JP | 2003-348121 A | 12/2003 |
| JP | 2004-128751 A | 4/2004 |
| JP | 2005-176071 A | 6/2005 |
| JP | 2005-244538 A | 9/2005 |
| JP | 2005-341413 A | 12/2005 |
| JP | 2006-013616 A | 1/2006 |
| JP | 2006-033261 A | 2/2006 |
| JP | 2006-270679 A | 10/2006 |
| JP | 2008-022182 A | 1/2008 |
| JP | 2008-166885 A | 7/2008 |
| JP | 2010-200219 A | 9/2010 |

* cited by examiner

PRIVATE BRANCH EXCHANGE, VOICE QUALITY ADJUSTMENT METHOD, AND NON-TRANSITORY COMPUTER-READABLE MEDIUM STORING VOICE QUALITY ADJUSTING PROGRAM

CROSS REFERENCE TO RELATED APPLICATIONS

This application is a National Stage of International Application No. PCT/JP2011/000977 filed Feb. 22, 2011, claiming priority based on Japanese Patent Application No. 2010-226578, filed Oct. 6, 2010, the contents of all of which are incorporated herein by reference in their entirety.

TECHNICAL FIELD

The present invention relates to a private branch exchange, a voice quality adjusting method, and a voice quality adjusting program.

BACKGROUND ART

In recent telephone systems, a number of systems using a hybrid private branch exchange (PBX) including both functions of a conventional line switching function and a Voice over Internet Protocol (VoIP) function have been constructed. This telephone system has enabled accommodation of telephones and communication lines including various types of interfaces with different voice call characteristics such as analog telephones, digital telephones, internet protocol (IP) telephones, analog lines, digital lines, and IP lines. In this way, the combination of the connection between telephones and the connection between a telephone and a communication line has been diversified, which complicates the connection configurations of the telephone systems.

This has expanded the number of persons and time required to perform an operation for adjusting audio quality by a maintenance terminal and for checking voice call quality for all the connection paths by a telephone as a telephone system. Further, professional engineers having knowledge of VoIP are also required, which requires further improvement in maintenance performance.

Further, some connection paths may include a plurality of gain circuits for adjusting voice call level and a plurality of echo canceller circuits for cancelling echo. Thus, it is required to determine optimal circuits which are to be used to adjust voice call quality, which is a difficult operation that requires adjustment by a professional engineer.

As a means for solving these problems, Japanese Unexamined Patent Application Publication No. 2005-176071, titled "HYBRID TELEPHONE SYSTEM WITH VOICE QUALITY MANAGEMENT FUNCTION, AND HYBRID PBX USING THE SAME" (Patent literature 1) proposes installing an external device for automatically adjusting voice call quality in a telephone system. The external device includes a function of performing examination of voice quality for each of various communication paths/data accumulation function, a function of adjusting the voice quality for each of various communication paths/setting and updating functions/a function of controlling validation/invalidation of an echo canceller, thereby being able to automatically optimize setting of various parameters regarding call voice quality in each communication path in an echo canceller.

CITATION LIST

Patent Literature

Patent literature 1: Japanese Unexamined Patent Application Publication No. 2005-176071 (pages 11-15)

SUMMARY OF INVENTION

Technical Problem

However, one problem caused in installation of the external device for automatically adjusting voice call quality as disclosed in Patent literature 1 is that it requires introduction of equipment other than the PBX, which requires investment in equipment and maintenance work of the external device.

The present invention has been made in view of such circumstances, and aims to provide a private branch exchange (PBX), a voice quality adjusting method, and a voice quality adjusting program capable of adjusting call voice level and call quality only with the private branch exchange according to the connection type of telephones and communication lines and delivering excellent voice call quality.

Solution to Problem

In order to solve the aforementioned problem, the private branch exchange, the voice quality adjusting method, and the voice quality adjusting program mainly employ the following characteristic configurations.

(1) A private branch exchange according to the present invention is a private branch exchange for performing an operation of connecting a telephone and a communication line for a telephone call, and includes an audio quality characteristic configuration database for storing an audio quality adjustment value of at least one of a gain circuit and an echo canceller circuit and a connection path database for storing information related to a connection path determined by a combination of a telephone and a communication line to connect for the telephone call. An optimal call quality can be obtained according to a combination for each group of at least one of a telephone type and a line type to connect for a telephone call. When there is a connection request from at least one of the telephone and the communication line, by referring to the audio quality characteristic configuration database, an audio quality adjustment value is determined to perform setting for at least one of the gain circuit and the echo canceller circuit. The gain circuit and the echo canceller circuit exist on a connection path. The connection path is determined by referring to the connection path database.

(2) A voice quality adjusting method according to the present invention is a voice quality adjusting method in a private branch exchange for performing an operation of connecting a telephone and a communication line for a telephone call. The private branch exchange includes an audio quality characteristic configuration database for storing an audio quality adjustment value of at least one of a gain circuit and an echo canceller circuit, and a connection path database for storing information related to a connection path determined by a combination of at least one of a telephone and a communication line to connect for a telephone call. An optimal call quality can be obtained according to a combination for each group of at least one of a telephone type and a line type to connect for the telephone call.

The voice quality adjusting method includes obtaining, by referring to the audio quality characteristic configuration database, an audio quality adjustment value to be set for at least one of the gain circuit and the echo canceller circuit, when there is a connection request from at least one of the telephone and the communication line, the gain circuit and the echo canceller circuit exist on the connection path determined by referring to the connection path database, and setting the audio quality adjustment value for at least one of the gain circuit and the echo canceller circuit.

(3) A voice quality adjusting program according to the present invention executes the voice quality adjusting method according to the above mentioned (2) as a program executable by a computer.

Advantageous Effects of Invention

According to the private branch exchange, the voice quality adjusting method, and the voice quality adjusting program of the present invention, it is possible to achieve the following effects.

First, an audio quality adjustment operation by a dial operation from a telephone which is in a telephone call is made possible, which makes it possible to execute check of voice quality and execute an operation of audio quality adjustment only by a telephone instead of a conventional procedure of repeating check of voice quality by a telephone and the audio quality adjustment operation by a maintenance terminal, thereby being able to reduce the operation of checking the voice call quality and the operation of adjusting the voice call quality.

Second, a connection path database is provided for storing audio quality adjustment part information patterned by connection paths of gain circuits or echo canceller circuits, which eliminates the need for selection of a gain circuit and an echo canceller circuit in which audio quality adjustment is to be performed which has conventionally required to be judged by a professional engineer, thereby being able to easily perform the operation of adjusting the voice call quality.

Third, an audio quality characteristic configuration database is provided for forming and storing audio quality adjustment value information in a group unit according to the characteristic of voice call of the telephone type or the communication line type, which enables audio quality adjustment of a plurality of connection paths having the same telephone type and the same communication line type by a single operation of checking the voice call quality and adjusting the audio quality, thereby being able to reduce the operation of checking the voice call quality and the operation of adjusting the audio quality.

Fourth, a maintenance terminal collectively specifies audio quality adjustment value information by the combination of the group to which the telephone type belongs and the group to which the communication line type belongs so as to be in conjunction with the audio quality characteristic configuration database for storing the audio quality adjustment value information in a group unit of the telephone type and the communication line type, and changes the audio quality adjustment value information which makes it possible to collectively change the plurality of connection paths specified by the combination of the groups and to reduce the operation of adjusting the audio quality from the maintenance terminal.

Fifth, all the functions for achieving the first to fourth effects are included in the private branch exchange (PBX), which eliminates the need to externally install a test adjustment apparatus or the like of voice call quality unlike the related art and enables construction of a telephone system for achieving improvement of maintainability in low cost.

DESCRIPTION OF EMBODIMENTS

Hereinafter, with reference to the accompanying drawings, a preferred exemplary embodiment of a private branch exchange, a voice quality adjusting method, and a voice quality adjusting program according to the present invention will be described. While the private branch exchange and the voice quality adjusting method according to the present invention will be described in the following description, such a voice quality adjusting method may be implemented as a voice quality adjusting program that can be executed by a computer or the voice quality adjusting program may be recorded in a recording medium that can be read out by a computer.

(Features of the Present Invention)

Prior to the description of an exemplary embodiment of the present invention, the outline of the features of the present invention will be described first. The main feature of the present invention is to provide a private branch exchange (PBX) having a function capable of easily adjusting voice call quality in a telephone system including the PBX only using the PBX without using an external device.

More specifically, the present invention is able to store an optimal setup value of an echo canceller and a setup value of audio level in advance for each type of telephones and communication lines in the PBX, and to select and set, only by the PBX, the optimal setup value of the echo canceller and the gain circuit according to a telephone number from which a call was made. Further, the PBX according to the present invention includes a mechanism for changing selection of the setup value currently set based on dial information that is input even during a telephone call. This enables adjustment of call voice level and call quality according to the telephone type and the communication line type, which enables to secure excellent voice call quality.

(Configuration Example of Exemplary Embodiment)

Figure 1:
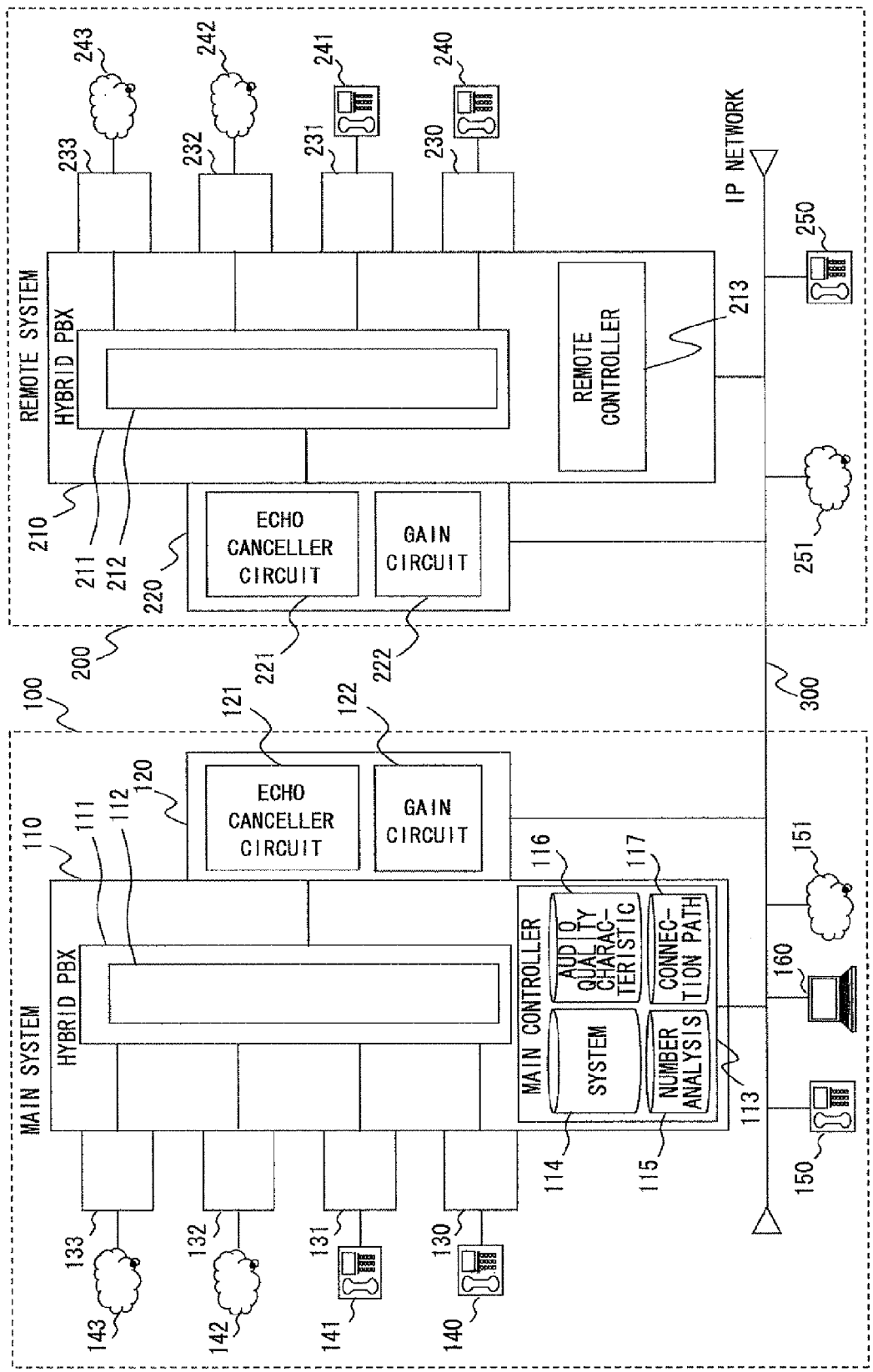
FIG. 1 is a configuration diagram showing one example of a block configuration of a private telephone according to the present invention.

Next, with reference to FIG. 1, a configuration example of a private telephone (PBX) according to the present invention will be described. FIG. 1 is a configuration diagram showing one example of a block configuration of the private telephone according to the present invention. FIG. 1 shows a configuration example of a case in which a voice quality adjustment function is further added to a hybrid PBX including both functions of a line switching function and a Voice over Internet Protocol (VoIP) function. In order to clearly explain an operation of the private telephone according to the present invention, a system configuration of the whole telephone system to which the private telephone is related is also shown in FIG. 1. Specifically, FIG. 1 also shows telephones connected to the private telephone, another private branch exchange for remotely controlling the private telephone via an IP network, and each component including digital lines and analog lines connected to a line network.

As shown in FIG. 1, this telephone system includes a main system 100 and a remote system 200 connected to each other through an IP network 300. The main system 100 is formed of a hybrid PBX 110 and the remote system 200 is formed of a hybrid PBX 210. The hybrid PBX 110 of the main system 100 is a host side main unit that performs the whole operation of the telephone system, and remotely controls the hybrid PBX 210 of the remote system 200 through the IP network 300.

The hybrid PBX 110 of the main system 100 includes, in a switch 111, in addition to a gain circuit 112 for controlling the audio level, a main controller 113 for controlling an operation of the whole telephone system including the remote system 200 as well as the main system 100. A VoIP interface card 120 for connecting an IP telephone 150, an IP line 151, a maintenance terminal 160 and the like is connected to the switch 111 of the hybrid PBX 110 through the IP network 300 to achieve the VoIP function. Further, an echo canceller circuit 121 for adjusting the voice call quality and a gain circuit 122 for adjusting the call voice level are included in the VoIP interface card 120.

Further, an analog telephone control card 130 for connecting an analog telephone 140, a digital telephone control card 131 for connecting a digital telephone 141, an analog line control card 132 for connecting an analog line 142, and a digital line control card 133 for connecting the digital line 143 are connected to the switch 111 of the hybrid PBX 110.

Further, the main controller 113 of the hybrid PBX 110 includes a system configuration DB 114 for storing data regarding a configuration of the whole telephone system including the main system 100 and the remote system 200 as a database, a number analysis DB 115 for storing data to analyze number information (dial information and the like) received from telephones/communication lines as a database, an audio quality characteristic configuration DB 116 for storing data regarding the optimal call quality characteristic for each combination of the telephone type and the communication line type as a database, and a connection path DB 117 for storing data regarding connection paths of the telephones/communication lines as a database.

The information of the system configuration DB 114 is registered by an input from the maintenance terminal 160 when the telephone system is constructed. The system configuration DB 114 is a database for storing an extension number of each of analog telephones 140 and 240, digital telephones 141 and 241, and IP telephones 150 and 250, analog telephone control cards 130 and 230, digital telephone control cards 131 and 231, and VoIP interface cards 120 and 220 to which telephones are respectively connected, information of each of communication lines of analog lines 142 and 242, digital lines 143 and 243, and IP lines 151 and 251, and analog line control cards 132 and 232, digital line control cards 133 and 233, and VoIP interface cards 120 and 220 to which communication lines are respectively connected.

The information of the number analysis DB 115 is registered by an input from the maintenance terminal 160 when the telephone system is constructed. The number analysis DB 115 is a database for storing dial numbers transmitted from the telephones or the communication lines to specify the connection destination, information regarding the combination of the telephone or the communication line to which the connection is made corresponding to the dial number, a dial number transmitted as an audio quality adjustment request dial number from the telephone which is in a telephone call to change the audio quality adjustment value information, and information regarding the combination of change values of the audio quality adjustment value information corresponding to the dial number.

The audio quality characteristic configuration DB 116 stores information regarding the optimal call quality in a group unit classified according to the characteristic of the voice call for each combination of the telephone type and the communication line type. The audio quality characteristic configuration DB 116 is a database for storing the information of the group classifications for all the telephone types and the communication line types, and optimal audio quality adjustment value information including operation parameter setup values of the echo canceller circuits 121 and 221 and audio level adjustment setup values to the gain circuits 112, 212, 122, and 222 that are necessary for each of the combinations of the groups.

Note that a standard value in consideration of each characteristic of the telephones or the communication lines is stored as an initial value of the audio quality adjustment value information by the input from the maintenance terminal 160 when the telephone system is constructed. However, both of the audio quality adjustment value information and group classifications regarding the telephone type and the communication line type that are stored may be changed as appropriate by a change operation performed by the maintenance terminal 160. The group classification of the voice call characteristic may be changed to an arbitrary group for each of extension numbers assigned to the telephones or for each of communication line information. The audio quality adjustment value information may be changed as appropriate for each combination of group classifications. The audio quality adjustment value information may also be changed by an input of an audio quality adjustment request dial number from the telephone which is in communication.

The information of the connection path DB 117 is registered by an input from the maintenance terminal 160 when the telephone system is constructed. The connection path DB 117 is a database for patterning, for the combination of switches in the switches 111 and 211 on the transit path and the VoIP interface cards 120 and 220 on the transit path assumed in consideration of the combinations of all the telephones or the communication lines that are able to perform a voice call, information regarding the transit number and the transit order of the gain circuits 112, 212, 122, and 222 and the echo canceller circuits 121 and 221 to store audio quality adjustment part information which indicates the parts of the echo canceller circuits 121 and 221 that set operation parameters and the gain circuits 112, 212, 122, and 222 performing the audio level adjustment for each pattern.

The main controller 113 including the four databases stated above includes control programs having functions for controlling the operation of the whole telephone system and controlling all the telephone control cards, communication line control cards, switches, and VoIP interface cards included in the main system 100 and the remote system 200. The main controller 113 also has a voice quality adjusting program for adjusting the audio quality of the voice during a telephone call for each combination of the telephone type and the communication line type as one of the control programs. In summary, the main controller 113 includes the judgment logic for optimizing setting of the audio level adjustment values to the gain circuits 112, 212, 122, and 222 and setting of the operation parameters of the echo canceller circuits 121 and 221 based on the information stored in the audio quality characteristic configuration DB 116 and the connection path DB 117. The main controller 113 further includes a function of controlling communication with the maintenance terminal 160, and a function of updating the afore-mentioned four databases according to the input from the maintenance terminal 160.

The remote system 200 connected to the main system 100 through the IP network 300 and remotely controlled by the hybrid PBX 110 of the main system 100 has substantially the same configuration as that of the main system 100. The hybrid PBX 210 of the remote system 200 includes a switch 211, a gain circuit 212, and a remote controller 213. The VoIP interface card 220 for connecting the IP telephone 250, the IP line 251 and the like is connected to the switch 211 through the IP network 300. The VoIP interface card 220 includes an echo canceller circuit 221 and a gain circuit 222.

Further, the analog telephone control card 230 for connecting the analog telephone 240, the digital telephone control card 231 for connecting the digital telephone 241, the analog line control card 232 for connecting the analog line 242, and the digital line control card 233 for connecting the digital line 243 are connected to the switch 211.

The remote controller 213 controls the whole operation of the hybrid PBX 210 in the remote system 200 based on control signals from the hybrid PBX 110 of the main system 100. Therefore, the remote controller 213 need not include a database such as the system configuration DB 114 or the like included in the main controller 113 of the hybrid PBX 110. More specifically, the remote controller 213 includes a control program having a function of relaying control signals between the main controller 113 of the hybrid PBX 110 of the main system 100 and the telephone control cards 230 and 231, the communication line control cards 232 and 233, the switch 211, and the VoIP interface card 220 and the like forming the remote system 200.

The main system 100 and the remote system 200 are connected, as described above, on the IP network 300. The states of the main system 100 and the remote system 200 may include a case in which the hybrid PBX 210 of the remote system 200 is used as a gateway of the hybrid PBX 110 of the main system 100 in addition to a case in which the hybrid PBX 210 of the remote system 200 is installed in the same part in order to increase the number of telephones or the number of communication lines to be used and a case in which the hybrid PBX 210 of the remote system 200 is installed in a different part to be used in an image of a dedicated line operating on the IP network 300.

In either case, in the line switching operation, the dial number information received from the communication lines 142, 143, and 151 or the communication lines 242, 243, and 251, or the telephones 140, 141, and 150 or the telephones 240, 241, and 250 connected in the main system 100 or the remote system 200 is analyzed in the main controller 113 based on the information stored in the number analysis DB 115, to identify the connection destination. The main controller 113 then reads out the information regarding the specified connection destination from the system configuration DB 114 to execute processing of connecting the switches 111 and 211 and the VoIP interface cards 120 and 220 on the transit path.
(Description of Operations of Exemplary Embodiment)

Next, with reference to operation explanatory diagrams shown in FIGS. 2 and 3, one example of operations of the private branch exchange in the telephone system shown in FIG. 1 will be described in detail.

Figure 2:
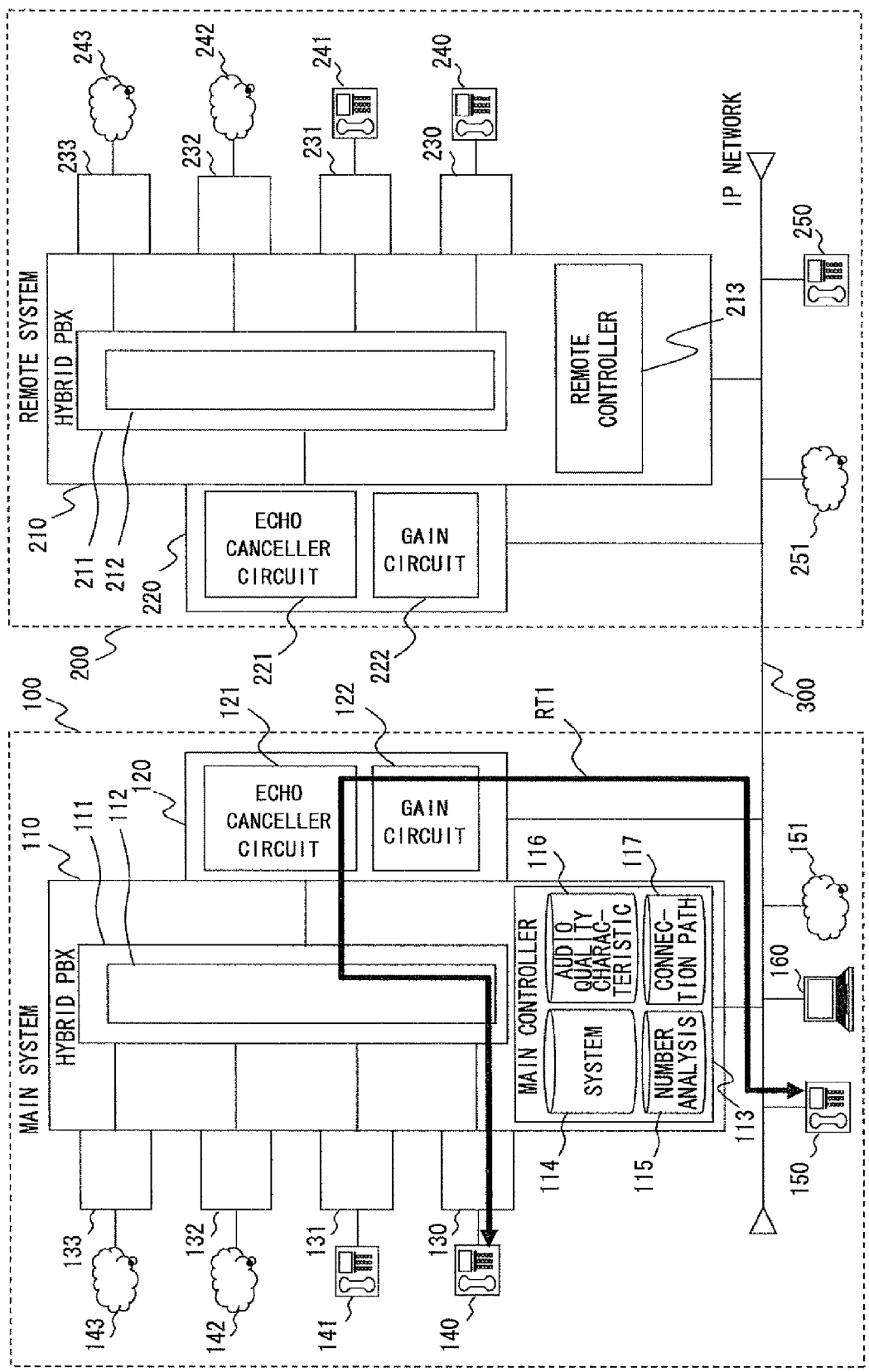
FIG. 2 is an operation explanatory diagram for describing one example of operations of a hybrid PBX of a main system shown in FIG. 1.

FIG. 2 is an operation explanatory diagram for describing one example of operations of the hybrid PBX 110 of the main system 100 shown in FIG. 1. The operation of the hybrid PBX 110 of the main system 100 will be described taking a connection path RT1 as an example, as shown in a thick line. The connection path RT1 is a path when the analog telephone 140 and the IP telephone 150 of the main system 100 are connected.

Figure 3:
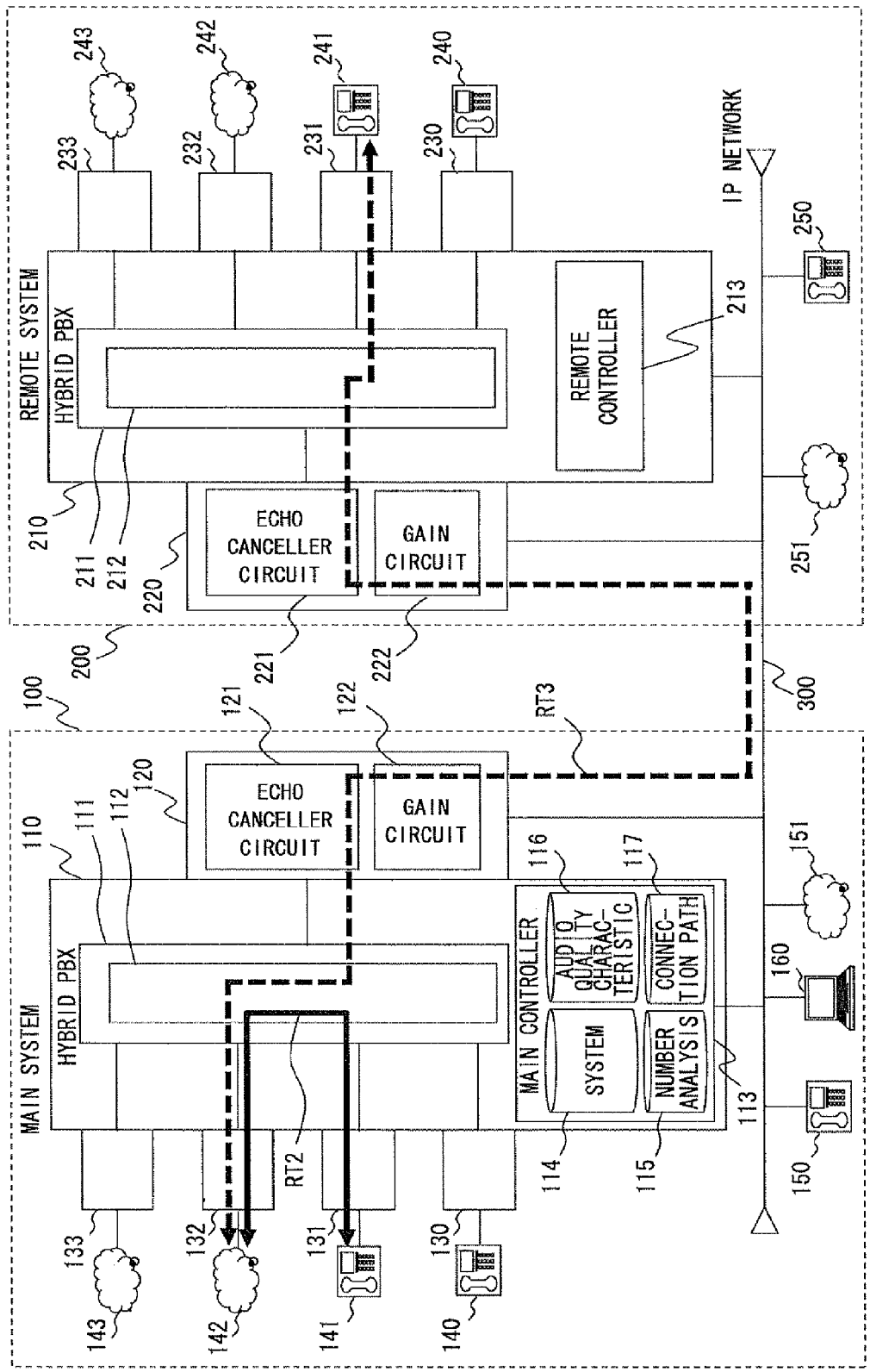
FIG. 3 is an operation explanatory diagram for describing another example of the operation of the hybrid PBX of the main system shown in FIG. 1.

Further, FIG. 3 is an operation explanatory diagram for describing another example of the operations of the hybrid PBX 110 of the main system 100 shown in FIG. 1. FIG. 3 shows an example of an operation of changing the setting of the audio quality adjustment value information as appropriate according to the type of the communication line and the type of the telephone to be connected. More specifically, FIG. 3 shows an operation of a case in which the audio quality adjustment value information is changed according to a dial operation from the digital telephone 141 which is during a telephone call in a connection path RT2 when the analog line 142 and the digital telephone 141 of the main system 100 are connected as shown in a thick solid line, and a subsequent operation regarding a case in which the audio quality adjustment value information is changed by a dial operation from the digital telephone 141 which is during a telephone call in a connection path RT3 when the analog line 142 of the main system 100 and the digital telephone 241 of the remote system 200 are connected as shown in a thick dashed line.

First, with reference to the operation explanatory diagram shown in FIG. 2, a process of the hybrid PBX 110 for specifying, from a call issuing operation by the analog telephone 140 which is a call issuing terminal, the IP telephone 150 which is a call receiving terminal, the connection path, the audio quality adjustment value information, and the audio quality adjustment part information will be described in order.

When the dial information of the extension number of the IP telephone 150 is input from the analog telephone 140, the main controller 113 of the hybrid PBX 110 analyzes the dial information that is input based on the information stored in the number analysis DB 115, whereby it is specified that the connection control with the IP telephone 150 is requested.

After that, the main controller 113 refers to the information stored in the system configuration DB 114 to determine to select, as a connection path when the analog telephone 140 and the IP telephone 150 perform a voice call, a path of the analog telephone 140-analog telephone control card 130-switch 111 (gain circuit 112)-VoIP interface card 120 (echo canceller circuit 121-gain circuit 122)-IP network-IP telephone 150 shown by the connection path RT1 of the thick solid line shown in FIG. 2.

Further, the main controller 113 requires, as voice quality adjustment for voice call performed between the analog telephone 140 and the IP telephone 150, audio quality adjustment value information including operation parameter setup values to the echo canceller circuit 121 and the audio level adjustment values to the gain circuits 112 and 122 that are audio quality adjustment values to be set, and audio quality adjustment part information indicating the echo canceller circuit 121 in which the operation parameters should be set and the gain circuits 112 and 122 in which the audio level adjustment should be performed that are targets for adjustment.

The main controller 113 is able to read out the audio quality adjustment value information in the connection path RT1 by searching a combination of the group of the voice call characteristic to which the analog telephone 140 belongs and the group of the voice call characteristic to which the IP telephone 150 belongs from the information stored in the audio quality characteristic configuration DB 116. The main controller 113 is further able to read out, as the audio quality adjustment part information in the connection path RT1, the information of the pattern of the gain circuit 112-echo canceller circuit 121-gain circuit 122 which indicates the transit number and the transit order of the gain circuits and the echo canceller circuit included in the connection path RT1, from the information stored in the connection path DB 117.

Accordingly, the main controller 113 sets the specified audio quality adjustment value information for the circuits indicated by the audio quality adjustment part information (the gain circuits 112 and 122 and the echo canceller circuit 121) by the aforementioned process of searching the information of the audio quality characteristic configuration DB 116 and the connection path DB 117 based on the information included in the connection path RT1, thereby being able to perform optimal audio quality adjustment in the optimal part in the connection path RT1.

Described next with reference to an operation explanatory diagram shown in FIG. 3 is an example of an operation of changing the setting of the audio quality adjustment value information as appropriate according to the type of the communication line and the type of the telephone to be connected. More specifically, described here is an operation of changing the setting of the audio quality adjustment value information based on the audio quality adjustment request dial number to allow the hybrid PBX 110 of the main system 100 to request the update of the audio quality adjustment value information from the digital telephones 141 and 241 that are during a telephone call in a case in which a call is received by the digital telephone 141 of the main system 100 from the analog line 142 by way of the connection path RT2 shown by the thick solid line, and a case in which, as a subsequent operation, the call is received by the digital telephone 241 of the remote system 200 from the analog line 142 by way of the connection path RT3 shown by the thick dashed line.

As described above, standard audio quality adjustment value information in consideration of the voice call characteristics of the telephone and the communications line is stored as an initial value in the audio quality characteristic configuration DB 116 of the hybrid PBX 110 of the main system 100 when the telephone system is constructed. However, the voice call characteristics of the telephone and the communication line are influenced by the line distance from an opposing apparatus or the like. Thus, changes to an audio quality adjustment value corresponding to the telephone type and the communication line type for each of the telephone types and the communication line types according to the various connection states are often required. Such an operation of adjusting the audio quality adjustment value is performed by repeating a telephone call test which actually uses the communication line and change of the audio quality adjustment value information based on the result of the telephone call test.

When the audio quality adjustment is performed for a connection path of the analog line 142-analog line control card 132-switch 111 (gain circuit 112)-digital telephone control card 131-digital telephone 141 as shown in the connection path RT2 of the thick solid line shown in FIG. 3, the analog line 142 and the digital telephone 141 are first set to the call state. Then, in the digital telephone 141 which is during a telephone call, a dial button corresponding to the audio quality adjustment value information which is desired to be adjusted is pressed as an audio quality adjustment request dial number.

The main controller 113 of the hybrid PBX 110 that received the audio quality adjustment request dial number from the digital telephone 141 determines the adjustment value of the audio quality adjustment value information corresponding to the received audio quality adjustment request dial number as a changed value with which the audio quality adjustment value information in the connection path RT2 should be updated based on the number analysis DB 115. After that, the main controller 113 searches the audio quality characteristic configuration DB 116 based on the group to which the analog line 142 of the connection path RT2 belongs and the group to which the digital telephone 141 belongs, and updates the audio quality adjustment value information stored as a combination of the group to which the analog line 142 belongs and the group to which the digital telephone 141 belongs with the changed value that is determined.

The audio quality adjustment value information of the audio quality characteristic configuration DB 116 that is updated is immediately reflected in the gain circuit 112 of the switch 111 in the connection path RT2 used for the telephone call while keeping the state in which the telephone call is made between the analog line 142 and the digital telephone 141. Accordingly, in the digital telephone 141 which is in the telephone call, it is possible to immediately reassure the voice call quality in which the audio quality adjustment value information after update is reflected. When further update of the audio quality adjustment value information is required, the operation of pressing the dial button corresponding to the audio quality adjustment value information which is desired to be adjusted as the audio quality adjustment request dial number and the operation of reassuring the voice call quality after the update are repeated in the digital telephone 141.

As stated above, by repeating the update of the audio quality adjustment value information and the reassurance of the voice call quality, it is possible to adjust the audio quality adjustment value information of the audio quality characteristic configuration DB 116 to the optimal audio quality adjustment value in the connection path RT2.

Described next is a process of updating, after the telephone call by the connection path of the connection path RT2 shown by the thick solid line in FIG. 3 is completed, the audio quality adjustment value information when a call is received by the digital telephone 241 of the remote system 200 from the same analog line 142, as shown in the connection path RT3 shown by the thick dashed line in FIG. 3. Specifically, a case will be described in which, after the telephone call by the connection path of the connection path RT2 shown by the thick solid line in FIG. 3 is completed, the audio quality adjustment is performed for the connection path of the analog line 142-analog line control card 132-switch 111 (gain circuit 112)-VoIP interface card 120 (echo canceller circuit 121-gain circuit 122)-IP network 300-VoIP interface card 220 (gain circuit 222-echo canceller circuit 221)-switch 211 (gain circuit 212)-digital telephone control card 231-digital telephone 241 shown by the connection path RT3 of the thick dashed line.

In such a case, as the combination of the communication line type and the telephone type, the combination of the analog line 142 and the digital telephone 241 shown by the connection path RT3 of the thick dashed line is the same to the combination of the digital telephone 141 and the analog line 142 shown by the connection path RT2 of the thick solid line in which the telephone call was just ended. Accordingly, the information of the audio quality characteristic configuration DB 116 referred at the step of operation of adjusting the audio quality in the connection path RT3 shown by the thick dashed line is the same to that in the case of the connection path RT2 shown by the thick solid line, as described above, and is the audio quality adjustment value information of a combination of the group to which the analog line belongs with the group to which the digital telephone belongs.

Accordingly, at the step of operation of adjusting the call voice quality in the connection path RT2 shown by the thick solid line in which the telephone call was just ended, the audio quality adjustment value information of the audio quality characteristic configuration DB 116 has already been updated with the optimal adjustment value, and the operation of adjusting the audio quality in the connection path RT3 shown by the thick dashed line is typically unnecessary.

However, the case of the connection path RT3 shown by the thick dashed line is a call mode that uses the VoIP function, as is different from the case of the connection path RT2 shown by the thick solid line, and the connection path of the VoIP interface card 120 (echo canceller circuit 121-gain circuit 122)-IP network 300-VoIP interface card 220 (gain circuit 222-echo canceller circuit 221)-switch 211 (gain circuit 212) is newly passed, which includes a new part as a part which requires audio quality adjustment.

Accordingly, at the stage at which the analog line 142 and the digital telephone 241 are in the telephone call state, the call quality test to reassure the voice call quality is performed in the digital telephone 241 which is in the telephone call state. When it is desired to adjust the audio quality in the digital telephone 241, a dial button corresponding to the audio quality adjustment value information which is desired to be adjusted is pressed as an audio quality adjustment request dial number. Since such an audio quality adjustment request dial number is input, the main controller 113 of the hybrid PBX 110 of the main system 100 is able to adjust the audio quality adjustment value information of the audio quality characteristic configuration DB 116 as the optimal audio quality adjustment value in the connection path RT3 so as to include the part of the audio quality adjustment of the echo canceller circuit 121 and the gain circuit 122 other than the gain circuit 112 of the hybrid PBX 110 of the main system 100, the gain circuit 222, the echo canceller circuit 221, and the gain circuit 212 of the hybrid PBX 210 of the remote system 200, as is similar to the case of the connection path RT2 shown by the thick solid line.

Note that the audio quality adjustment value information of the audio quality characteristic configuration DB 116 can also be updated from the maintenance terminal 160, as is similar to the case in which the audio quality is adjusted from the telephone which is in the telephone call state. Further, the update of the audio quality adjustment value information of the audio quality characteristic configuration DB 116 from the maintenance terminal 160 may be executed by dialing the dial number to specify the communication line or the telephone to be updated and the audio quality adjustment request dial number, as is similar to the case in which the audio quality of the telephone is adjusted. However, this can also be executed using a more simplified interface. For example, when the audio quality adjustment value information of the audio quality characteristic configuration DB 116 is changed from the maintenance terminal 160, the main controller 113 of the main system 100 provides the combination of the group to which the telephone type belongs and the group to which the communication line type belongs set in the audio quality characteristic configuration DB 116. Then, one or a plurality of connection paths specified by each of one or a plurality of combinations of the group to which the telephone type belongs and the group to which the communication line type belongs may be collectively specified and changed so as to be in conjunction with the group unit set in the audio quality characteristic configuration DB 116 using the interface specifying the combination of the groups.

As described above, by performing the audio quality adjustment operation on the connection path in which a telephone call is being performed to an arbitrary adjustment value by the dial operation of the audio quality adjustment request dial number in the telephone which is in the telephone call, or the audio quality adjustment operation to an arbitrary adjustment value by the dial operation of the audio quality adjustment request dial number in which a plurality of connection paths are collectively specified in the maintenance terminal 160, it is possible to perform the operation of adjusting audio quality according to the telephone type and the communication line type for an arbitrary connection path.

(Description of Effects of the Exemplary Embodiment)

As described above in detail, the following effects can be obtained in the exemplary embodiment.

First, an audio quality adjustment operation by a dial operation from a telephone which is in a telephone call is made possible. This makes it possible to execute check of voice quality and execute an operation of audio quality adjustment only by a telephone instead of a conventional procedure of repeating check of voice quality by a telephone and the audio quality adjustment operation by a maintenance terminal. Therefore, it is possible to reduce the operation of checking the voice call quality and the operation of adjusting the voice call quality.

Second, a database for storing audio quality adjustment part information patterned by the transit number and the transit order of gain circuits and echo canceller circuits is provided in a hybrid PBX 110 as a connection path DB 117. This makes it possible to eliminate the need for selection of a gain circuit and an echo canceller circuit in which audio quality adjustment is to be performed which has conventionally required to be judged by a professional engineer, thereby being able to easily perform the operation of adjusting the voice call quality.

Third, a database for forming and storing audio quality adjustment value information in a group unit according to the characteristic of voice call of the telephone type or the communication line type is provided in the hybrid PBX 110 as an audio quality characteristic configuration DB 116. This enables audio quality adjustment of a plurality of connection paths having the same telephone type and the same communication line type by a single operation of checking the voice call quality and adjusting the audio quality, thereby being able to reduce the operation of checking the voice call quality and the operation of adjusting the audio quality.

Fourth, a maintenance terminal 160 collectively specifies audio quality adjustment value information by the combination of the group to which the telephone type belongs and the group to which the communication line type belongs so as to be in conjunction with the database for storing the audio quality adjustment value information in a group unit of the telephone type and the communication line type as the audio quality characteristic configuration DB 116, and changes the audio quality adjustment value information. This makes it possible to collectively change the plurality of connection paths specified by the combination of the groups and to reduce the operation of adjusting the audio quality from the maintenance terminal 160.

Fifth, all the functions for achieving the first to fourth effects are included in the hybrid PBX 110 of the main system 100. This eliminates the need to externally install a test adjustment apparatus or the like of voice call quality unlike the related art and enables construction of a telephone system for achieving improvement of maintainability in low cost.

While the present invention has been described as a hardware configuration in the exemplary embodiment stated above, the present invention is not limited to this. The present invention may also achieve any desired processing by causing a central processing unit (CPU) to execute a computer program.

The program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

While the present invention has been described above with reference to the exemplary embodiment, the present invention is not limited to the above exemplary embodiment. The configuration and details of the present invention can be modified in various manners which can be understood by those skilled in the art within the scope of the invention.

This application is based upon and claims the benefit of priority from Japanese Patent Application No. 2010-226578, filed on Oct. 6, 2010, the disclosure of which is incorporated herein in its entirety by reference.

REFERENCE SIGNS LIST

100 MAIN SYSTEM
110 HYBRID PBX
111 SWITCH
112 GAIN CIRCUIT
113 MAIN CONTROLLER
114 SYSTEM CONFIGURATION DB
115 NUMBER ANALYSIS DB
116 AUDIO QUALITY CHARACTERISTIC CONFIGURATION DB
117 CONNECTION PATH DB
120 VoIP INTERFACE CARD
121 ECHO CANCELLER CIRCUIT
122 GAIN CIRCUIT
130 ANALOG TELEPHONE CONTROL CARD
131 DIGITAL TELEPHONE CONTROL CARD
132 ANALOG LINE CONTROL CARD
133 DIGITAL LINE CONTROL CARD
140 ANALOG TELEPHONE
141 DIGITAL TELEPHONE
142 ANALOG LINE
143 DIGITAL LINE
150 IP TELEPHONE
151 IP LINE
160 MAINTENANCE TERMINAL
200 REMOTE SYSTEM
210 HYBRID PBX
211 SWITCH
212 GAIN CIRCUIT
213 REMOTE CONTROLLER
220 VoIP INTERFACE CARD
221 ECHO CANCELLER CIRCUIT
222 GAIN CIRCUIT
230 ANALOG TELEPHONE CONTROL CARD
231 DIGITAL TELEPHONE CONTROL CARD
232 ANALOG LINE CONTROL CARD
233 DIGITAL LINE CONTROL CARD
240 ANALOG TELEPHONE
241 DIGITAL TELEPHONE
242 ANALOG LINE
243 DIGITAL LINE
250 IP TELEPHONE
251 IP LINE
300 IP NETWORK

The invention claimed is:

1. A private branch exchange comprising:
an audio quality characteristic configuration database for storing an audio quality adjustment value of at least one of a gain circuit and an echo canceller circuit, optimal call quality being able to be obtained according to a combination for each group of at least one of a telephone type and a line type to connect for a telephone call; and
a connection path database for storing information related to a connection path determined by a combination of a telephone and a communication line to connect for the telephone call,
wherein, when there is a connection request from at least one of the telephone and the communication line, by referring to the audio quality characteristic configuration database, an audio quality adjustment value is determined to perform setting for at least one of the gain circuit and the echo canceller circuit, the gain circuit and the echo canceller circuit exist on a connection path, and the connection path is determined by referring to the connection path database,
wherein when the audio quality adjustment request dial number is received from the telephone being in the telephone call state, the audio quality adjustment value of the audio quality characteristic configuration database is updated with a changed value corresponding to an audio quality adjustment request dial number,
wherein the audio quality adjustment request dial number requests change of the audio quality adjustment value stored in the audio quality characteristic configuration database regarding a combination of at least one of the line type and the telephone type being in a telephone call state,
further comprising an interface able to collectively specify one or a plurality of groups to update the audio quality adjustment value stored according to a combination for each group of at least one of the telephone type and the line type of the audio quality characteristic configuration database from a maintenance terminal for maintaining a private telephone.

2. The private branch exchange according to claim 1, wherein, when the audio quality adjustment request dial number from the telephone being in the telephone call state is received and the audio quality adjustment value of the audio quality characteristic configuration database is updated, while on the telephone, the audio quality adjustment value updated for at least one of the gain circuit and the echo canceller circuit used for the telephone call is reset.

3. A voice quality adjusting method comprising:
including, in a private branch exchange, an audio quality characteristic configuration database for storing an audio quality adjustment value of at least one of a gain circuit and an echo canceller circuit, and a connection path database for storing information related to a connection path determined by a combination of at least one of a telephone and a communication line to connect for a telephone call, optimal call quality being able to be obtained according to a combination for each group of at least one of a telephone type and a line type to connect for the telephone call,
obtaining, by referring to the audio quality characteristic configuration database, an audio quality adjustment value to be set for at least one of the gain circuit and the echo canceller circuit, when there is a connection request from at least one of the telephone and the communication line, the gain circuit and the echo canceller circuit exist on the connection path determined by referring to the connection path database, setting the audio quality adjustment value for at least one of the gain circuit and the echo canceller circuit, and updating the audio quality adjustment value of the audio quality characteristic configuration database with a changed value corresponding to an audio quality adjustment request dial number, when the audio quality adjustment request dial number is received from the telephone being in the telephone call state, the audio quality adjustment request dial number requests change of the audio quality adjustment value stored in the audio quality characteristic configuration database regarding a combination of at least one of the line type and the telephone type being in a telephone call state, further comprising, by means of an interface, collectively specifying one or a plurality of groups to update the audio quality adjustment value stored according to a combination for each group of at least one of the telephone type and the line type of the audio quality characteristic configuration database from a maintenance terminal for maintaining a private telephone.

4. The voice quality adjusting method according to claim 3, comprising, when the audio quality adjustment request dial number from the telephone being in the telephone call state is received and the audio quality adjustment value of the audio quality characteristic configuration database is updated, while on the telephone, resetting the audio quality adjustment value updated for at least one of the gain circuit and the echo canceller circuit used for the telephone call.

5. A non-transitory computer readable medium storing a voice quality adjusting program, wherein the non-transitory computer readable medium executes the voice quality adjusting method according to claim 3 as a program executable by a computer.

* * * * *